Figure 3:
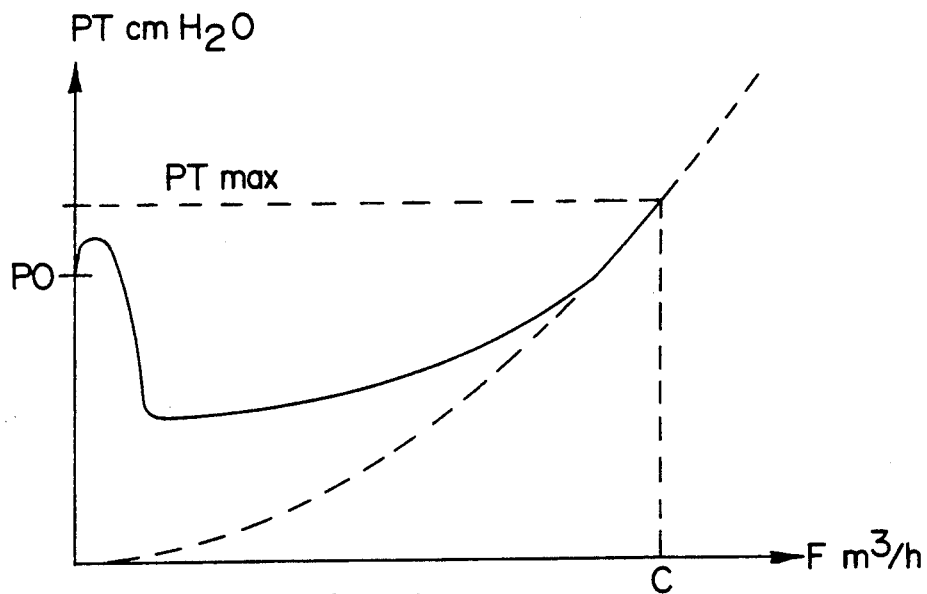

United States Patent [19]

Sorensen

[11] Patent Number: 5,060,688
[45] Date of Patent: Oct. 29, 1991

[54] PRESSURE RELIEF VALVE FOR PRESSURE EQUALIZATION BETWEEN A CLOSED SPACE AND THE SURROUNDING ATMOSPHERE

[76] Inventor: Emil A. Sorensen, Schützenmatte 2 A, CH-6362 Stansstad, Switzerland

[21] Appl. No.: 548,898
[22] PCT Filed: Feb. 21, 1990
[86] PCT No.: PCT/DK90/00050
  § 371 Date: Jul. 25, 1990
  § 102(e) Date: Jul. 25, 1990
[87] PCT Pub. No.: WO90/10168
  PCT Pub. Date: Sep. 7, 1990

[30] Foreign Application Priority Data

Feb. 24, 1989 [DK] Denmark ................ 877/89

[51] Int. Cl.$^5$ ............................................. F16K 17/32
[52] U.S. Cl. ................................................ 137/471
[58] Field of Search ............... 137/471, 541, 533.17

[56] References Cited

U.S. PATENT DOCUMENTS

| | | | |
|---|---|---|---|
| 253,622 | 2/1882 | Pearson | 137/471 |
| 2,784,737 | 3/1957 | Kelly | 137/541 X |
| 3,294,116 | 12/1966 | Trémeau | 137/541 |
| 3,444,886 | 5/1969 | Bailey et al. | 137/541 |
| 3,999,571 | 12/1976 | Pedersen | 137/533.17 |
| 4,181,144 | 1/1980 | Lander | 137/541 X |
| 4,474,208 | 10/1984 | Looney | 251/332 X |

Primary Examiner—Stephen M. Hepperle
Attorney, Agent, or Firm—Pravel, Gambrell, Hewitt, Kimball & Krieger

[57] ABSTRACT

A pressure relief valve for pressure equalization between a closed space and the surrounding atmosphere comprises a valve housing (1) with an upwardly facing blow-off opening (11) in which a conical valve seat (13) is formed. A drop-shaped body (14) arranged in the blow-off opening (11) is formed on its underside with a conical valve surface (15) co-operating with the valve seat (13). The drop-shaped body is connected with a lifting disc (21) which has a larger area than the valve seat (13) and is surrounded by a free passage slot (22). By suitable dimensioning, advantageous characteristics can be obtained for pressure and blow-off velocity as functions of the blow-off quantity, and the blow-off will always take place in the form of a jet which by means of the drop-shaped body (14) is directed vertically upwards at high velocity.

13 Claims, 2 Drawing Sheets

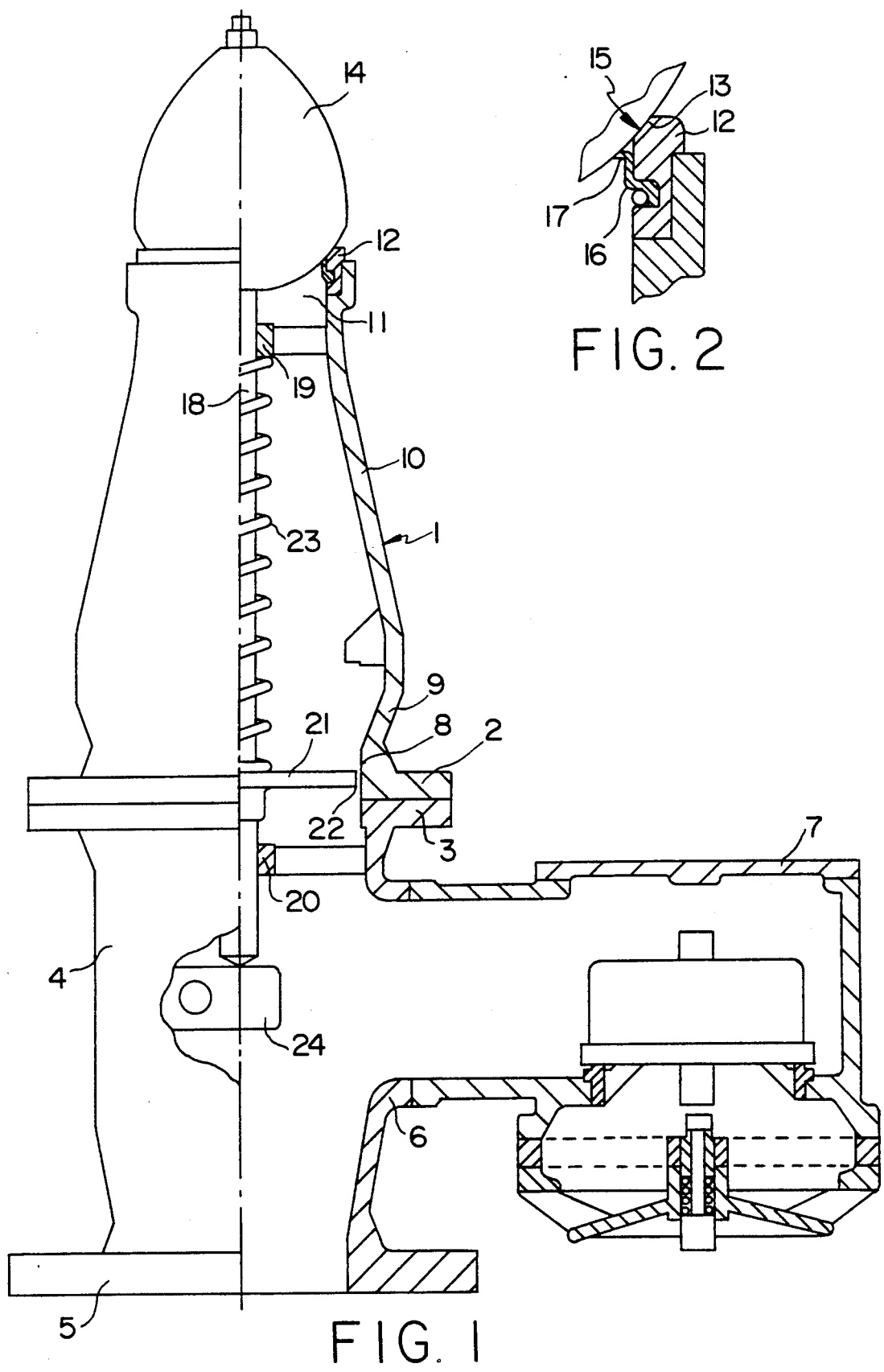

PRESSURE RELIEF VALVE FOR PRESSURE EQUALIZATION BETWEEN A CLOSED SPACE AND THE SURROUNDING ATMOSPHERE

The invention relates to a pressure relief valve for pressure equalization between a closed space and the surrounding atmosphere. A particularly important field of use of such pressure relief valves is for tankers for oil products and chemicals, and in the following explanation and description this field of use will be taken as point of departure, but it will be understood that the same principles will be equally applicable to other fields of use, e.g. for stationary storage tanks or for rolling transportation tanks for liquid petroleum products or chemicals.

When a certain volumetric quantity of product per time unit, e.g. measured in m$^3$/h, is loaded into a tank, the pressure relief valve is to be opened, when the pressure in the tank has risen to a pre-set opening pressure, and thereafter a quantity of gas is to be blown off per time unit corresponding to the quantity of product loaded per time unit with an addition, where applicable, for evaporation from the liquid surface in the tank. The blow-off quantity per time unit depends on the flow resistance of the valve—and thereby on the lifting height of the valve—and on the pressure in the tank. The maximum blow-off quantity per time unit—with deduction of any addition for evaporation—which is obtainable without the pressure in the tank exceeding a certain safety limit is referred to as the capacity of the pressure relief valve, which is thus a measure of the maximum permissible loading quantity per time unit (e.g. m$^3$/h).

When loading is stopped, and the pressure in the tank drops to a value, the closing pressure, which is slightly lower than the opening pressure, the pressure relief valve is closed. When the tank is unloaded, the gas pressure in the tank drops. To prevent a drop of pressure below a certain safety limit a vacuum valve may be used, which may be built together with the pressure relief valve or may be separately mounted. In certain cases an inert gas, such as nitrogen, is for safety reasons supplied to the free space above the liquid surface in the tank, such gas being automatically maintained at a pre-determined pressure, that may be higher than the atmospheric pressure, but lower than the opening pressure of the pressure relief valve. In this case, too, a vacuum relief valve may be used as a reserve in the case of failure of the supply of inert gas.

When the temperature of the surroundings increases or decreases during storage or transport, the gas pressure in the tank will increase or decrease, and thereby the pressure relief valve is opened and closed in principle in the same manner as in the case of loading and unloading, though normally for substantially shorter periods and with smaller blow-off quantities per time unit. Similarly a vacuum relief valve and/or a system for the supply of inert gas operates in principle in the same manner as in the case of unloading.

Pressure relief valves for use in oil tankers have to fulfill strict safety requirements which are laid down in internationally recognized rules. The most important of these are:

1. Passage of flame from the surroundings through the pressure relief valve to the interior of the tank, generally referred to as flash-back, must be positively precluded.

2. If safety against flash-back in the open condition of the valve is obtained solely by means of a high blow-off velocity—so-called high velocity valves—the blow-off velocity must not at any time during the opening sequence of the valve fall below a prescribed minimum value, e.g. 30 m/sec.

3. The blow-off shall be in the form of a vertically upwards directed jet in order to keep any injurious or inflammable gases as far as possible away from places where people are present.

4. In the case of icing-up of the valve, it shall be possible to de-ice the valve quickly, simply and so efficiently as to restore the valve to normal operation.

The pressure relief valve here considered is of the kind comprising a valve housing having an upwardly facing blow-off opening in which a drop-shaped body is provided, which is suitable for concentrating a flow of gas impinging on its underside to an upwardly directed jet, said body being rigidly connected with a lifting disc provided at a lower level within the housing.

From U.S. Pat. No. 3,999,571 a pressure relief valve of this kind is known, in which the lifting disc is constructed as a valve body having an annular plane valve surface closing against a mating valve seat in the valve housing, while the drop-shaped body fits at a small clearance in the blow-off opening of the valve.

In this known valve, the above mentioned safety rules 1-3 are fulfilled because the blow-off always takes place in the form of a vertically upwards directed gas jet at high velocity. Also safety rule 4 is fulfilled because the guiding of the gas jet takes place without use of surrounding guiding surfaces so that any ice formation is directly accessible from outside. A relatively small ice formation can be broken away just by lifting the valve by means of the manual check-lift with which a pressure relief valve must always be provided, and larger deposits of ice can easily be chopped off because they are located entirely outside the valve, whereafter the last remains can be broken away by lifting of the valve as described.

It is the object of the invention to modify the known valve in such a manner that, while maintaining its advantages, a higher lifting speed, and thereby a lower increase of pressure, is obtained at the initiation of the opening, as compared with the known valve.

To achieve this, the invention is characterized in that the drop-shaped body is constructed at the downwardly facing portion of its rounded surface with an annular, substantially conical valve face, thereby constituting a valve body adapted to close against a mating valve seat in the mouth of the blow-off opening, and that the lifting disc has an outer diameter greater than the inner diameter of the valve seat and in the closing position of the drop-shaped valve body is surrounded by a free passage slot.

Due to this arrangement the lifting pressure is shifted, at the initiation of the opening, from the smaller area of the underside of the drop-shaped member within the valve seat to the larger area of the lifting disc, whereby a higher lifting speed is obtained. However, the area of the lifting disc must of course be kept within a limit such that even in the case of small blow-off quantities the blow-off velocity will always be higher than the prescribed safety limit, e.g. 30 m/sec.

In an advantageous embodiment of a pressure relief valve according to the invention, the valve housing has an inner configuration such that the free passage area around the lifting disc is increased when the drop-shaped body and the lifting disc are lifted.

Hereby the advantage is obtained that also at increasing blow-off quantity, a lower pressure is obtained than would otherwise be possible, until the valve approaches its fully open condition.

If it is desired to obtain a particularly high degree of tightness of the valve in its fully closed condition, e.g. in order to reduce waste of inert gas, this may be obtained, according to the invention, by providing an annular elastic gasket along the inner periphery of the valve seat, said gasket having a lip which in the closing position of the drop-shaped body applies itself sealingly to the underside of the drop-shaped body.

Figure 4:
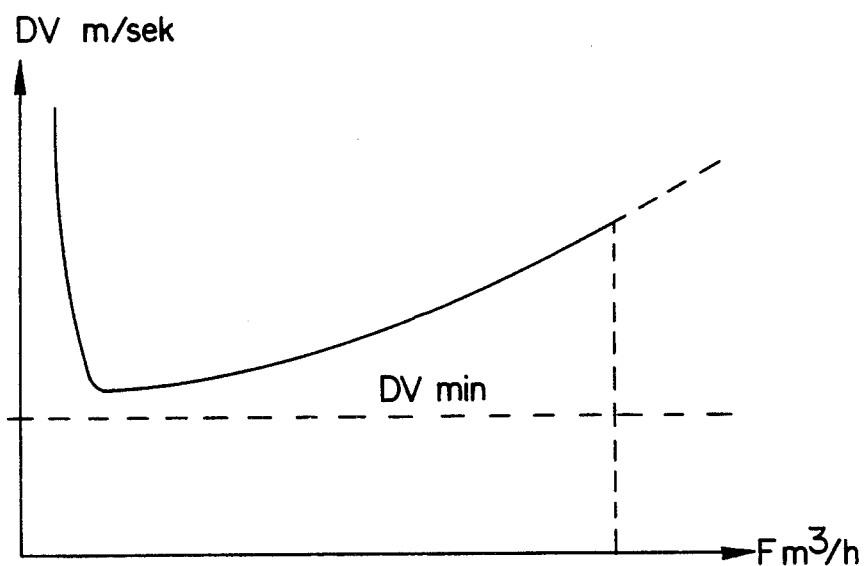

The invention will now be described in more detail with reference to the accompanying drawings, in which FIG. 1 shows a pressure relief valve according to an embodiment of the invention, in side view and partly in section, FIG. 2 is a partial section on a larger scale through the area adjacent the blow-off opening of the pressure relief valve, FIGS. 3 and 4 show characteristic lines representing the tank pressure and the blow-off velocity, respectively, as plotted against the blow-off quantity per time unit, as determined for a prototype of a pressure relief valve constructed in accordance with the invention.

In the drawings, 1 is a vertically oriented valve housing, which at its lower end has a flange 2 which is bolted to a flange 3 of a tubular socket 4 constructed at its lower end with a flange 5 that can be bolted to a pressure relief outlet of an oil tank or to the upper end of a pressure relief pipe connected to one or more tank compartments. In the embodiment shown, the socket 4 has a lateral opening 6 to which a vacuum relief valve 7 is connected. This valve will not be described in detail, because it does not form part of the invention.

At its lower end, the valve housing has a cylindrical wall portion 8 which in a direction upwards is followed by a diverging wall portion 9 and thereafter a converging wall portion 10 which at the top of the valve housing is terminated by a blow-off opening 11.

In the blow-off opening there is mounted a mouth ring 12 at the inner side of which a conical valve seat 13 is formed. In the blow-off opening 11 there is arranged a drop-shaped body 14 on the underside of which a conical valve surface 15 is formed which in the closed condition of the valve sealingly engages the valve seat 13. For improving the tightness, an annular elastic gasket 16 may be arranged on the inner side of the mouth ring 12, said gasket having a lip 17 engaging the underside of the drop-shaped body 14.

A stem 18 is connected to the drop-shaped body and extends down through the housing where it is guided by an upper stem guide 19 in the valve housing and a lower stem guide 20 in the socket 4. The stem 18 carries a lifting disc 21 which is located in the interior of the cylindrical wall portion 8 and has a slightly smaller diameter than the latter so that a free passage slot 22 is formed around the lifting disc. Under the lower end of the stem 18 there is mounted a rocking lever 24 for use in check-lift of the valve.

A compressional spring 23 is interposed between the upper stem guide 18 and the lifting disc 21. Thus, the structure comprising the drop-shaped body 13, the stem 18 and the lifting disc is subjected to a downwardly directed closing force equal to the compressional force of the spring 23 +the total weight of all parts of the structure. If these parts are so constructed that their own weight provides a suitable closing force, the spring 23 may be omitted.

If a pressure in excess of that of the atmosphere comes up in the tank, then, owing to the leakage through the slot 22, this pressure will propagate to the space above the lifting disc 21, and this will therefore be subjected to the same pressure from above and from below. A lifting force is therefore produced solely by the action of the excess pressure on the underside of the drop-shaped body. This lifting force is equal to the excess pressure multiplied by the cross-sectional area of the blow-off opening inside the valve seat.

When the lifting force exceeds the previously mentioned closing force, the valve is opened. This takes place at a predetermined value of the tank pressure, the opening pressure, which is pre-set by dimensioning the weight of the drop-shaped body 14, the stem 18 and the lifting disc 21, which may be supplemented by an additional weight load and/or a compressional spring 23. When the blow-off commences at the opening of the valve, the pressure on the upper side of the lifting disc drops, and the net value of the lifting force becomes equal to the tank pressure multiplied by the area of the lifting disc. Since this is larger than the area of the blow-off opening, the lifting force is augmented, and thereby the lifting speed and hence the blow-off quantity per time unit are increased.

When the valve is further lifted, the lifting disc 21 arrives into the area of the diverging wall portion 9, whereby the blow-off quantity is further increased.

The over-all dimensioning should be such that for a given application suitable characteristic lines are obtained for the tank pressure PT and the blow-off velocity DV as plotted against the blow-off quantity per time unit F. Examples of such characteristic lines are shown in FIGS. 3 and 4.

As is apparent from FIG. 3, an increase of the tank pressure PT above the opening pressure PO takes place at a small blow-off quantity F. This situation occurs immediately after the opening of the valve, but owing t the quick opening of the valve, the tank pressure will even in the case of a relatively high opening pressure PO be kept well within the permissible limit PTmax. At increasing blow-off quantity the tank pressure drops anew and gradually approaches the value it would have at blow-off with fully open valve, cf. the dotted graph. At continued increase of the blow-off quantity, the tank pressure increases further, and when it assumes the value PTmax, the blow-off quantity has reached the maximum permissible value, i.e. the capacity C of the pressure relief valve considered. If during loading of the tank, the quantity loaded per time unit, with deduction for evaporation, if any, is kept below the said value, the tank is, within a substantial safety margin, protected against explosion, and this also applies during transport because, as previously mentioned, it can be expected that the blow-off quantities occurring as a consequence of increases of temperature will be considerably lower than during loading.

By varying the dimensioning, various types of pressure relief valves can be produced having the same build-up, but different capacity.

From FIG. 4 it is apparent that at low blow-off quantity F, the blow-off velocity D will be very high, and will then, at increasing blow-off quantity, drop to a minimum value and then again increase. The minimum value must be well above the prescribed minimum velocity DVmin, e.g. 30 m/sec., securing against flashback.

In the closed position of the valve, the engagement of the valve surface 15 of the drop-shaped body 14 with the valve seat 13, supplemented by the gasket 16, ensures a very high degree of tightness.

In case the gasket 15 is damaged, or completely destroyed, e.g. by burning, melting, aging or mechanical injury, the tightness of the valve will still be sufficient for securing against flash-back, so that the safety rule 1 mentioned in the introduction will still be fulfilled, also in the closed position of the valve.

Absolute gas tightness can never be obtained by the mutual engagement of metal surfaces, and it is to be expected that with a conical valve seat and an axially guided valve body the leakage will be slightly greater than in the case of a plane valve body. However, in the pressure relief valve according to the invention without a gasket, any leakage of gas in the closed position f the valve will, owing to the smallness of the passage area, take place at high blow-off velocity, and will, owing to the aerodynamic effect of the drop-shaped body, be directed vertically upwards. To ensure that flash-back is also precluded in a situation where the pressure in the tank is not above that of the atmosphere, the annular surface of engagement between the valve seat and the drop-shaped member is given a width such that a flame will be quenched by the cooling taking place in the leakageway. Normally, the gasket 16 can therefore be omitted without noticeable disadvantage, but when an atmosphere of an inert gas is maintained in the tank, the gasket 16 will be useful for reducing the loss of inert gas.

In the case of icing-up of the valve, de-icing can be performed as previously described.

I claim:

1. A pressure relief valve for pressure equalization, between a closed space and the surrounding atmosphere, comprising:
   (a) a valve housing (1) having an upwardly facing blow-off opening (11) at the top of the valve housing;
   (b) an upper valve seat at the blow-off opening;
   (c) a valve lifting disc movable within he valve housing;
   (d) a valve stem attached to the valve disc for movement therewith;
   (e) a drop-shaped body (14) attached to the upper end portion of the valve stem and which is shaped for concentrating a flow of gas impinging on its underside to an upwardly directed jet, said body (14) being connected by the valve stem with the lifting disc (21);
   (f) the drop-shaped body (14) having an upper pointed tip portion and a downwardly facing rounded surface with an annular valve face (15) adapted to close against the upper valve seat (13) in the mouth of the blow-off opening (11);
   (g) the lifting disc (21) has an area greater than the cross-sectional area of the blow-off opening inside the valve seat (13) and in the closing position of the drop-shaped valve body (14) is spaced from the valve housing to provide a free passage slot (22) between the lifting disc and valve housing.

2. Pressure relief valve as in claim 1, characterized in that the valve housing (1) has an inner configuration such that the free passage area around the lifting disc (21) is increased when the drop-shaped body (14) and the lifting disc (21) are lifted.

3. Pressure relief valve as in claim 1, characterized in that along the inner periphery of the valve seat (13) an annular elastic gasket (16) is provided having a lip (17) which in the closing position of the drop-shaped body (14) applies itself sealingly to the underside of the drop-shaped body (14).

4. A pressure relief valve for pressure equalization, between a closed space and the surrounding atmosphere, comprising
   (a) a valve housing having an upwardly facing blow-off opening at the top of the valve housing;
   (b) an upper annular valve seat surrounding the blow-off opening;
   (c) a valve lifting disc movable within the valve housing;
   (d) a valve stem attached to the valve disc for movement therewith and extending upwardly therefrom within the housing;
   (e) a drop-shaped body attached to the upper end portion of the valve stem and which is shaped with a rounded bottom portion and a pointed tip portion for concentrating a flow of gas impinging on its underside to an upwardly directed jet, said body being connected by the valve stem to the lifting disc;
   (f) the drop-shaped body having a downwardly facing rounded surface with an annular valve face thereon adapted to close against the upper annular valve seat provided in the blow-off opening;
   (g) the disc and housing being sized to provide a gas flow space between the disc and housing and in the closing position of the drop-shaped valve body; and
   (h) the valve housing has an inner configuration such that the free passage slot around the disc is increased when the drop-shaped body and disc are lifted.

5. The pressure relief valve of claim 1 further comprising means for biasing the drop shaped body to a closing position.

6. The pressure relief valve of claim 5 wherein the biasing means extends along the stem and between the disc and drop shaped body.

7. The pressure relief valve of claim 5 wherein the biasing means is a coil spring mounted on the valve stem.

8. The pressure relief valve of claim 4 wherein the lifting disc has an outer diameter greater than the inner diameter of the valve seat.

9. The pressure relief valve of claim 4 wherein the valve housing includes an inner wall configuration that provides increased free passage area around the lifting disc when the lifting disc and drop shaped body are lifted.

10. A pressure relief valve for pressure equalization between a closed space and the surrounding atmosphere, comprising:
    (a) a valve housing having an uppermost blow-off opening surrounded by a valve seat;
    (b) a blow-off controlling member comprising a drop-shaped body with a lower rounded surface and an upper pointed tip portion, and shaped for concentrating a flow of gas impinging on its lower surface to an upwardly directed jet, said drop-shaped body being located in said blow-off opening in a closing position;

(c) a lifting disc connected with said drop-shaped body and located at a lower level within the housing;

(d) said blow-off controlling member being constructed with an annular valve face adapted to close against the valve seat defining said closing position;

(e) said valve face is formed on the lower rounded surface of said drop-shaped body; and (f) that the lifting disc in the closing position of the drop-shaped valve body is spaced from the valve housing to define a free passage slot therebetween.

11. A pressure relief valve for pressure equalization between a closed space and the surrounding atmosphere, comprising:

(a) a valve housing having an upwardly facing blow-off opening widened at its top to form an annular valve seat;

(b) a blow-off flow controlling member comprising a drop-shaped body with a rounded underside and a pointed tip, and shaped for concentrating a flow of gas impinging on the underside to an upwardly directed jet, said drop-shaped body being located in said blow-off opening in a closing position;

(c) a lifting disc having an outer diameter greater than the inner diameter o the valve seat, rigidly connected with said drop-shaped body;

(d) said blow-off controlling member being constructed with an annular valve face on the rounded underside adapted to close against the valve seat to define said closing position;

(e) a free passage slot at the lifting disc in the closing position of the drop-shaped valve body.

12. The apparatus of claim 11 wherein the free passage slot surrounds the lifting disc.

13. A pressure relief valve for pressure equalization, between a closed space and the surrounding atmosphere, comprising (a) a valve housing having an upwardly facing blow-off opening at the top of the valve housing;

(b) an upper annular valve seat surrounding the blow-off opening;

(c) a valve lifting disc movable within the valve housing;

(d) a valve stem attached to the valve disc for movement therewith and extending upwardly therefrom within the housing;

(e) a drop-shaped body attached to the upper end portion of the valve stem and which is shaped with a rounded bottom portion and a pointed tip portion for concentrating a flow of gas impinging on its underside to an upwardly directed jet, said body being connected by the valve stem to the lifting disc;

(f) the drop-shaped body having a downwardly facing rounded surface with an annular valve face thereon adapted to close against the upper annular valve seat provided in the blow-off opening;

(g) the disc and housing being sized to provide a gas flow space between the disc and housing and in the closing position of the drop-shaped valve body; and (h) the valve housing has an inner configuration such that the free passage slot around the disc is increased when the drop-shaped body and disc are lifted.

* * * * *